R. W. SPENCER.
Cotton-Cultivator.
No. 222,541.                Patented Dec. 9, 1879.
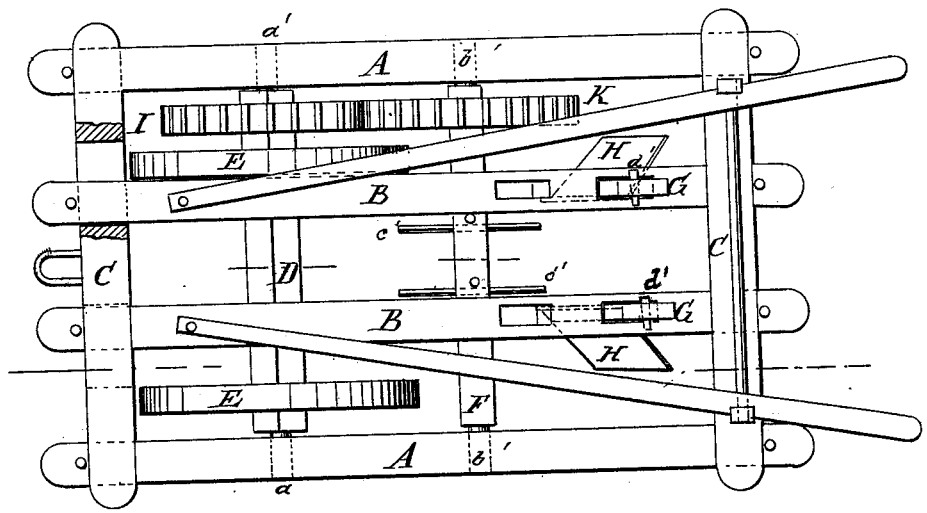
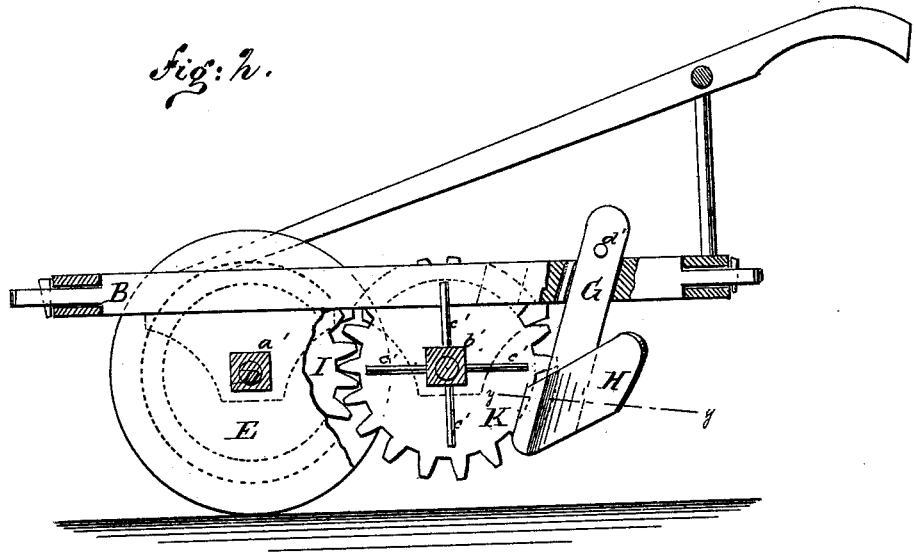
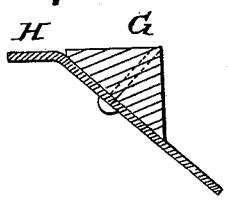
WITNESSES:                                INVENTOR:
                                          R. W. Spencer
                                       BY
                                          ATTORNEYS.

UNITED STATES PATENT OFFICE.

RICHERSON W. SPENCER, OF NEW LEXINGTON P. O., ALABAMA.

IMPROVEMENT IN COTTON-CULTIVATORS.

Specification forming part of Letters Patent No. 222,541, dated December 9, 1879; application filed May 22, 1879.

*To all whom it may concern:*

Be it known that I, RICHERSON W. SPENCER, of New Lexington P. O., in the county of Tuscaloosa and State of Alabama, (residing in Fayette county, Alabama,) have invented a new and Improved Cotton-Cultivator, of which the following is a specification.

Figure 1 of the drawings is a plan of the cultivator. Fig. 2 is a sectional side elevation. Fig. 3 is a sectional view of the plow or scraper on the line $y\,y$, Fig. 2.

Similar letters of reference indicate corresponding parts.

The object of this invention is to furnish an improvement in that class of cultivators by which both sides of a row can be cultivated at the same time; and it consists of certain novel features, which will be first described in connection with the drawings, and then pointed out in the claims.

In the drawings, A A and B B represent a timber frame composed of four longitudinal pieces, and across their ends, holding them together, the two cross-timbers C C. The timbers B B are laterally adjustable along the timbers C C, so that they can be made to approach or recede from each other. The forward end of this frame rests upon the axle D, that revolves in boxes $a'\,a'$, and on which are immovably fixed the two wheels E E.

On the under side of the frame, about midway of its length and revolving in the journal-boxes $b'\,b'$, is a shaft, F, carrying arms or spokes $c'\,c'$, that are passed through the shaft so as to cross each other at right angles.

In mortises or sockets in the longitudinal beams B B are held, by pins $d'\,d'$, the standards G G, which carry on their lower ends the cultivators or scrapers H H. By providing these standards with a series of holes they can be vertically adjusted in their sockets, and can at will be changed to the other sockets or mortises in the beams, so that several changes of their actual and relative positions may be made. The scraper, with one edge bent at an angle to the body thereof, as shown in Fig. 3, will throw the earth sidewise from the rows of plants.

The shafts D and F are provided with cog-wheels I and K, respectively, the one meshing into the other, so that when the cultivator is in motion the revolutions of the shaft D, which cause the cog-wheel I to revolve, cause the shaft F to revolve likewise.

The function of the revolving arms is to remove the trash from before the scrapers, so that it shall not be thrown upon the young plants and injure them.

When the cultivators are set as shown in Fig. 1 they will cultivate on both sides of a row of plants, in which case the shaft F, carrying the arms, may be removed, if necessary.

When it is desired to cultivate but one side of a row, both scrapers may be set in either one of the beams B B, and the forward cultivator may be adjusted advantageously at a higher level than the rear one.

I do not broadly claim the adjustable timbers B B, for I am aware that such adjustable timbers have before been used in cultivators; but,

Having thus fully described my invention, I claim as new and desire to secure by Letters Patent—

1. The within-described cultivator, consisting of the fixed longitudinal pieces A A, the adjustable pieces B B, the cross-pieces C C, axle D, wheels E E, shaft F, provided with arms $c'\,c'$, standards G G, scrapers H H, and cog-wheels I and K, constructed and arranged substantially as herein shown and described.

2. The shaft F, provided with the arms or spokes $c'$ and the cog-wheel K, and revolving in bearings $b'$, attached to the under side of the frame, about midway of its length, in combination with the shaft D, provided with the cog-wheel I, the frame A, and the scrapers H, substantially as and for the purpose set forth.

RICHERSON WINGFIELD SPENCER.

Witnesses:
ALEXANDER VICK,
MARION VICK.